(12) United States Patent
Vikman et al.

(10) Patent No.: US 6,690,942 B2
(45) Date of Patent: Feb. 10, 2004

(54) MOBILE APPLICATION PART (MAP) INTERFACE FOR EXCHANGING SHORT MESSAGES WITH A SCP

(75) Inventors: Tuija Vikman, Lempäälä (FI); Tuure Leinonen, Helsinki (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 10/073,676

(22) Filed: Feb. 11, 2002

(65) Prior Publication Data

US 2002/0123360 A1 Sep. 5, 2002

Related U.S. Application Data

(63) Continuation of application No. PCT/EP99/06506, filed on Sep. 3, 1999.

(51) Int. Cl.[7] ................................................. H04Q 7/20
(52) U.S. Cl. ................ 455/466; 455/412.1; 455/414.1; 455/433; 455/412.2; 455/414.2; 370/410; 370/448
(58) Field of Search .............................. 455/466, 412.1, 455/414, 422, 412.2, 414.1, 414.2; 370/448, 410; 379/221.08, 221.09, 229

(56) References Cited

U.S. PATENT DOCUMENTS 5,629,974 A * 5/1997 Rajala et al. ............... 370/448
5,678,179 A * 10/1997 Turcotte et al. ............ 340/7.51
5,946,630 A * 8/1999 Willars et al. .............. 455/466
5,966,663 A * 10/1999 Gleason ..................... 455/466

FOREIGN PATENT DOCUMENTS

WO       WO 98/56202       * 12/1998       ............ H04Q/7/38

* cited by examiner

Primary Examiner—Nay Maung
Assistant Examiner—Alan T. Gantt
(74) Attorney, Agent, or Firm—Ware Fressola Van Der Sluys & Adolphson LLP

(57) ABSTRACT

A method for transmitting specific information between a controlling network element and a terminal device via a service center in a communication network, said method comprising the steps of transmitting user data and said specific information between said network element and said service center via a first communication connection by using an interworking functionality; and forwarding at least said specific information from said service center to said terminal device by using a gateway functionality. It is further possible to check whether a confirmation for outgoing of said specific information to said terminal device is required. If such a confirmation is required, routing information for said controlling network element is requested and received by said service center from a network element. The routing information is used for transmitting a status report from said service center to said controlling network element. Moreover, the present invention proposes a corresponding device and/or system.

21 Claims, 6 Drawing Sheets

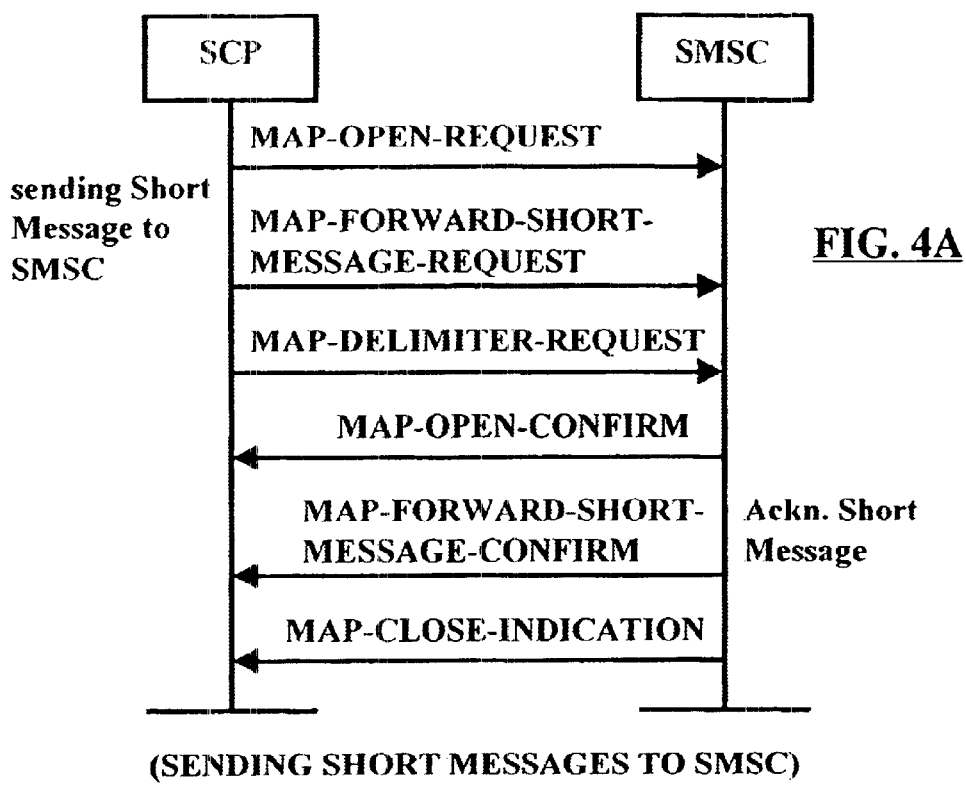
FIG. 4A (SENDING SHORT MESSAGES TO SMSC)
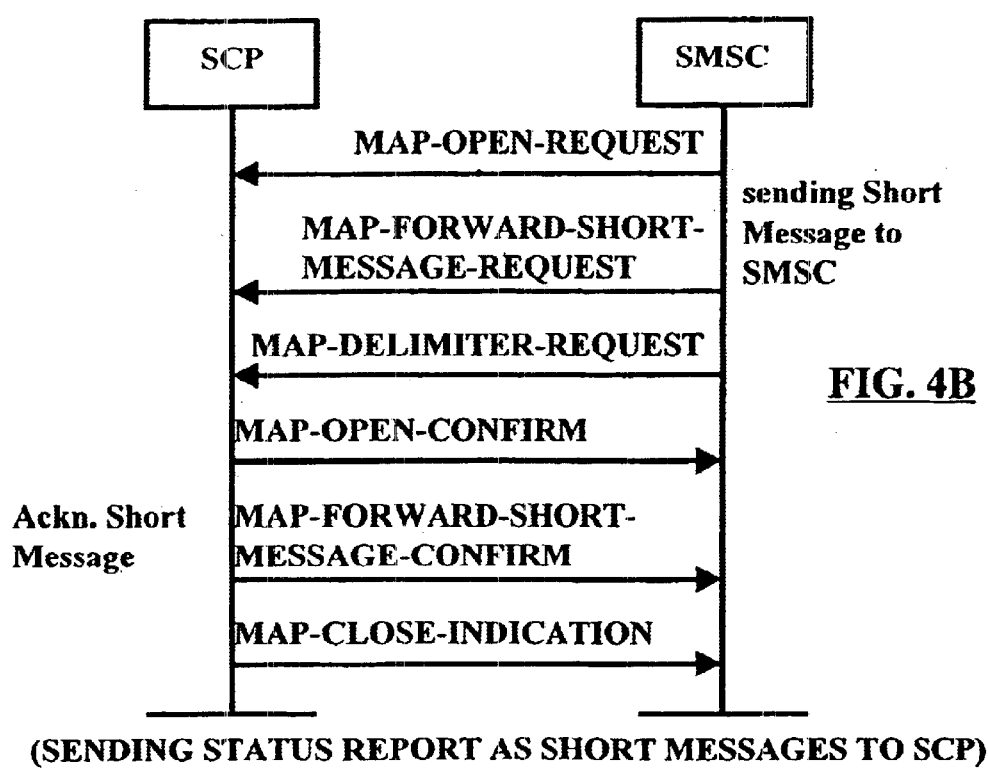
FIG. 4B (SENDING STATUS REPORT AS SHORT MESSAGES TO SCP)

MOBILE APPLICATION PART (MAP) INTERFACE FOR EXCHANGING SHORT MESSAGES WITH A SCP

CROSS-REFERENCE TO RELATED APPLICATION

This application is a continuation of International Application PCT/EP99/06506 having an international filing date of Sep. 3, 1999 and from which priority is claimed under all applicable sections of Title 35 of the United States Code including, but not limited to, Sections 120, 363 and 365(c).

FIELD OF THE INVENTION

The present invention relates to a method for transmitting specific information between a controlling network element and a mobile station via a service center in a communication network and also to corresponding devices and/or a corresponding system. In particular, the present invention is directed to such a method and corresponding devices as well as a system applicable in an intelligent network

BACKGROUND OF THE INVENTION

In the last years, telecommunication system and in particular mobile telecommunication systems such as GSM (Global System for Mobile communication) and the like became widely spread all over the world. Due to an increasing competition between network operators the offering of additional services besides the initial object of transmitting speech becomes more and more important.

Recently, a more flexible telecommunication network architecture has been developed, namely the intelligent network (IN). One example of such an intelligent network is CAMEL (Customised Applications for Mobile network Enhanced Logic) which is accommodated to the GSM system. The aim of such intelligent networks is for example to enable the creation of customised services that could be used by roaming subscribers. Furthermore, the introduction of new services in telecommunication networks shall be facilitated. The central authority in such an intelligent network is a so-called service control point (SCP) which controls distinct calls.

One example for an additional service is a so-called Localized GSM service. Here, one or more Localized Service Areas (LSA) such as a home area are predefined for a subscriber of the mobile telecommunication system. In such an area costs for outgoing (and/or incoming) calls may be set lower (reduced rate) than in other areas (normal rate) for the corresponding subscriber. It is necessary to send specific information, i.e. Localized Service Area information, from the network to a terminal device to be used in the telecommunication network, such as a mobile station, used by the subscriber. In this way it is for example possible to inform the subscriber about his or her presence or absence in his or her localized service area. Said specific information may be stored in the Subscriber Identity Module (SIM) card of the subscriber. It is to be noted that the SCP sends the LSA information only when the information is changed in the databases of the intelligent network, not at every location update.

Another example of such a service is e.g. a prepaid SIM service in which calls are paid beforehand by the subscriber. In this case, specific information, such as credit information, is sent from the network to the mobile station of the subscriber, for example, to inform him or her about a call end or the like. This offers the possibility for said subscriber to be informed all the time about his or her actual credit information.

In mobile telecommunication systems, for communication between the different network elements, such as a mobile switching center (MSC), a home location register (HLR) but also a service control point SCP as a controlling network element of an intelligent network IN and the like, for example so-called Mobile Application Part (MAP) services are used. Such MAP services enable to transfer data such as cellular subscriber information such as mobile identification number (MIN) information and the serial number of the radio signal itself, as well as service information and the like between the network elements (for example between a SCP and a MSC or a HLR) by using a MAP protocol which includes several parameters or primitives.

A short message service (SMS) for transferring text messages is one example for a service which uses MAP services for transmitting data. It is for example commonly known to send short messages between two subscribers. It is also possible that a Voice Mailbox system could use short messages to indicate the presence of a recorded voice message to a subscriber. The SMS could need a short message service center for managing and controlling the transfer of such a short message.

However, services like the above described Localized GSM service or the prepaid SIM service require a data transfer, e.g. of user and/or service data and the specific information itself, between the mobile station (subscriber) and the corresponding controlling network element providing said services, for example a Service Control Point (SCP) of an intelligent network. In some cases it is necessary not only to provide for example a text message directly to the subscriber e.g. by a display in the mobile station, but also to store said specific information in the Subscriber Identity Module SIM for further processing and/or later display. Furthermore, especially in the case of credit information, it is necessary to provide a high level of reliability and security.

Document WO 98/25426 describes a call setup process which allows a mobile terminal to use services of an intelligent network. For the communication between a SCP and a mobile terminal, e.g. for the transmission of network specific information, unstructured supplementary service data (USSD) are used.

Also document DE 197 17 588 A1 describes the usage of USSD for the transmission of data to a mobile station.

Documents WO 98/56202, WO 95/12933, and U.S. Pat. No. 5,408,419 describe a usage of short messages in transmissions between cellular network elements and mobile terminals.

SUMMARY OF THE INVENTION

Therefore, it is an object of the present invention to provide a method for transmitting service specific information between a controlling network element and a terminal device via a service center, and to provide corresponding devices and a corresponding system which enable a transfer of said service specific information.

According to the present invention, there is proposed a method for transmitting user specific data and network specific information between a service control point of an intelligent network and a terminal device in a mobile communication network via a short message service center of said mobile communication network, said method comprising the steps of transmitting said user specific data and network specific information between said service control point and said short message service center via a first mobile application part protocol based communication connection by using a short message service interworking functionality; and forwarding at least said network specific information from said short message service center to said terminal device by using a short message service gateway functionality.

Furthermore, the present invention proposes device located in a service control point of an intelligent network in a mobile communication network, said device comprising transceiver means for transmitting user specific data and network specific information between said service control point and a short message service center via a mobile application part protocol based communication connection by using a short message service interworking functionality.

Furthermore, the present invention proposes a device located in a short message service center of a communication network, said device comprising transceiver means for transmitting user specific data and network specific information between a service control point of an intelligent network and said short message service center via a mobile application part protocol based communication connection by using a short message service interworking functionality.

Moreover, the present invention proposes a system comprising a first device located in a service control point of an intelligent network in a mobile communication network, said first device comprising transceiver means for transmitting user specific data and network specific information between said service control point and a short message service center via a mobile application part protocol based communication connection by using an short message service interworking functionality, and a second device located in a short message service center of a mobile communication network, said second device comprising transceiver means for transmitting user specific data and network specific information between said service control point and a short message service center via a mobile application part protocol based communication connection by using a short message service interworking functionality.

Advantageous further developments of the present invention are as set out in the respective dependent claims.

According to the present invention, the proposed method and/or device and/or system allow a reliable transfer of service specific information between a service control point SCP and a mobile station by using short message service via a short message service center SMSC in a service bound sending. They are easy to implement since only minor changes in recent network structures and elements are required.

Moreover, the usage of MAP protocol guarantees a high compatibility for different kinds of SMSCs. The service specific information in the form of short messages can for example be stored for a further processing on the SIM card.

Furthermore, by using an advantageous aspect of the present invention, it is possible to confirm the outcome of the service specific information such as a short message from the service center to the mobile station by notifying the controlling network element.

Additionally, the present invention can easily be specified for different implementations. For example, it is possible to set, whether confirmation for an outgoing short message to the mobile station is required or not. This can also be decided depending on a type of the MAP indicated by the version number used by one of the communicating partners. As a confirmation, a status report of the SMSC to the SCP may be used, wherein routing information used for said status report can be requested by the service control point itself or by a home location register HLR.

Furthermore, both the SCP and the SMSC can cancel the communication connection. This is the case, for example, due to an error. It is to be noted, that with the present invention implemented the service control point SCP is handled like a mobile station/subscriber and works as if it is a short message service center SMSC.

Preferred embodiments of the invention are described herein below in detail by way of example with reference to the accompanying drawings.

BRIEF DESCRIPTION OF THE DRAWINGS

FIGS. 4A and 4B are message charts illustrating a dialogue between two network elements.

DESCRIPTION OF PREFERRED EMBODIMENTS

Figure 1:
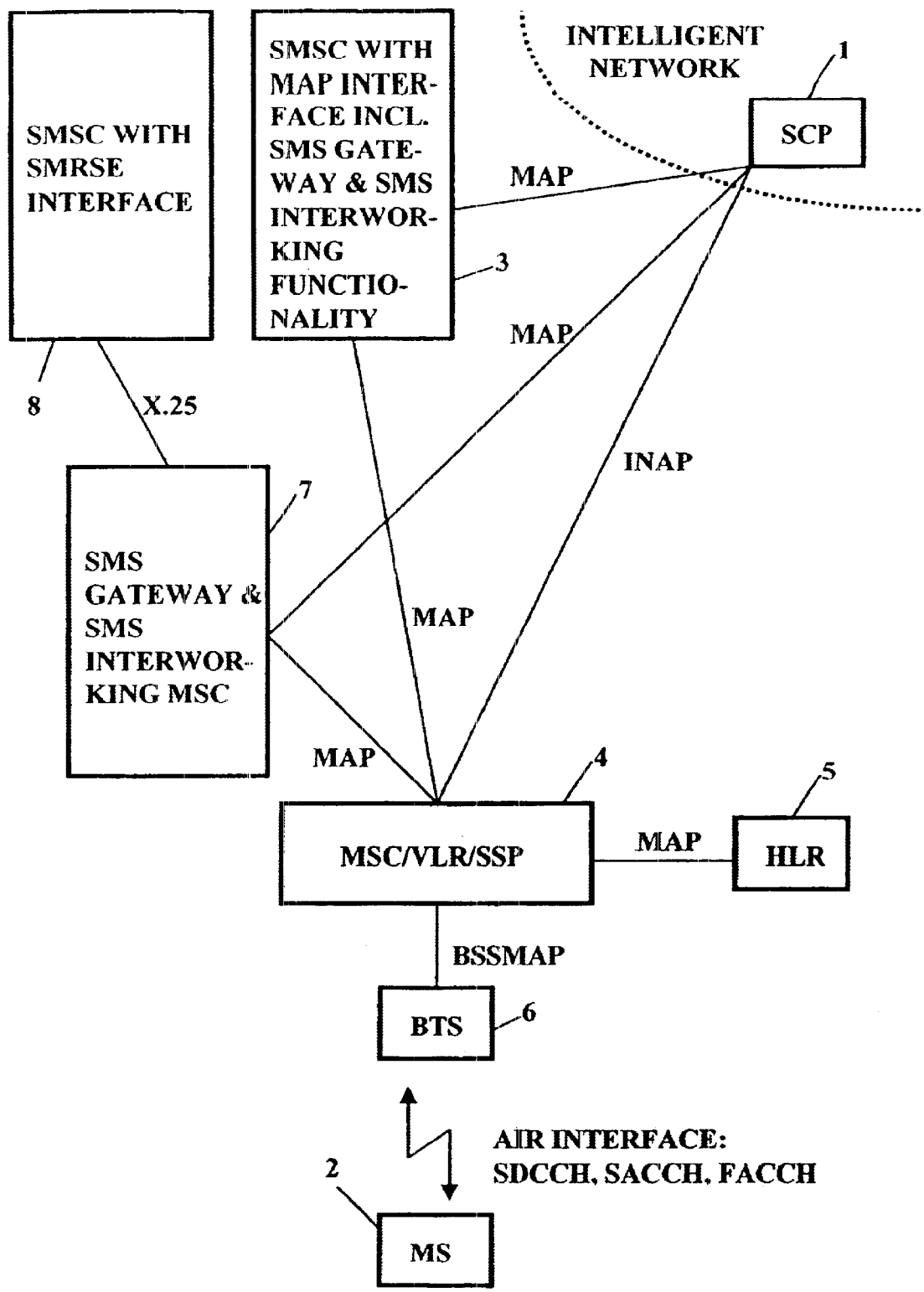
FIG. 1 is a block diagram illustrating a part of a network structure of a mobile telecommunication system.

In the following a mobile telecommunication system is described with reference to FIG. 1, in which text messages such as short messages concerning for example service information are sent between a controlling network element 1 of an intelligent network IN and a mobile station 2.

A service control point 1 which is the controlling part of the intelligent network IN is connected via MAP (Mobile Application Part) interfaces to a short message service center SMSC 3 with MAP interface, and to a SMS (short message service) gateway and SMS interworking MSC (mobile switching center) 7. The SCP 1 is further connected via an intelligent network application protocol INAP interface to an entity 4 including a mobile switching center MSC, a visitor location register VLR and a service switching point SSP. The entity 4 is also connected via MAP interfaces to the above mentioned SMSC 3 with MAP interface and the SMS gateway and SMS interworking MSC 7 and to a home location register HLR 5. Further, it is connected via a base-station system MAP (BSSMAP) interface to at least one base transceiver station 6 which is connected via an air interface, i.e. via corresponding channels SDCCH, SACCH, FACCH, to the mobile station 2. The above mentioned SMS gateway and SMS interworking MSC 7 is further connected to a short message service center SMSC 8 with a short message relay service element SMRSE interface via a X.25 interface.

For the sake of simplicity all interfaces (MAP, INAP, BSSMAP, X.25) shown in FIG. 1 are illustrated as direct connections between the corresponding network elements. However, it is to be noted that also other network elements may be involved through which messages are transmitted. Furthermore, although illustrated as separate network elements, the mobile switching center MSC 4 may include the SMS gateway and SMS interworking MSC 7 to form one entity. Likewise, other functional blocks shown in FIG. 1 can be combined or even broken down into smaller functional blocks carrying out part of the overall function.

The operation of transmitting short messages relating for example to service specific information from the service control point SCP 1 to the mobile station 2 is as follows.

Short messages are always routed to the mobile station 2 via a short message service center SMSC. First, the short message is sent from the SCP 1 to the SMSC 3 or SMS Interworking MSC 7 via a SMS interworking functionality. This interworking functionality can reside either in the SMS interworking MSC 7 or in the SMSC 3. For sending of the short message the mobile application part MAP protocol is used. Then, also by using the MAP protocol, the short message is forwarded to the mobile switching center MSC via a SMS gateway functionality. Said SMS gateway functionality can reside either in the SMS gateway MSC 7 or in the SMSC 3. Thereafter, the short message is sent to its destination, i.e. to the mobile station 2 via the base transceiver station 6, like any mobile terminating short message.

To operate in the above described manner, the service control point has to implement an originating and terminating short message service which comprises specific MAP functionality. In particular, these functionality is MAP-Forward-Short-Message for sending a short message from the SCP to the SMSC and to receive a status report as confirmation, and Send-Routing-Info-For-SM for sending routing information used for said status report. Said particular functionality will be described later.

As mentioned above, for transmitting the short messages, the MAP protocol is used. For the MAP protocol, in combination with transmission of short messages, there are several MAP services defined. The MAP services are used to establish a communication connection, to check service requirements, to request and receive service parameters, to send corresponding messages, to close communication connections and the like.

In the following, a method for transmitting short messages between a SCP and a mobile station via a SMSC is described with reference to FIG. 2.

Figure 2:
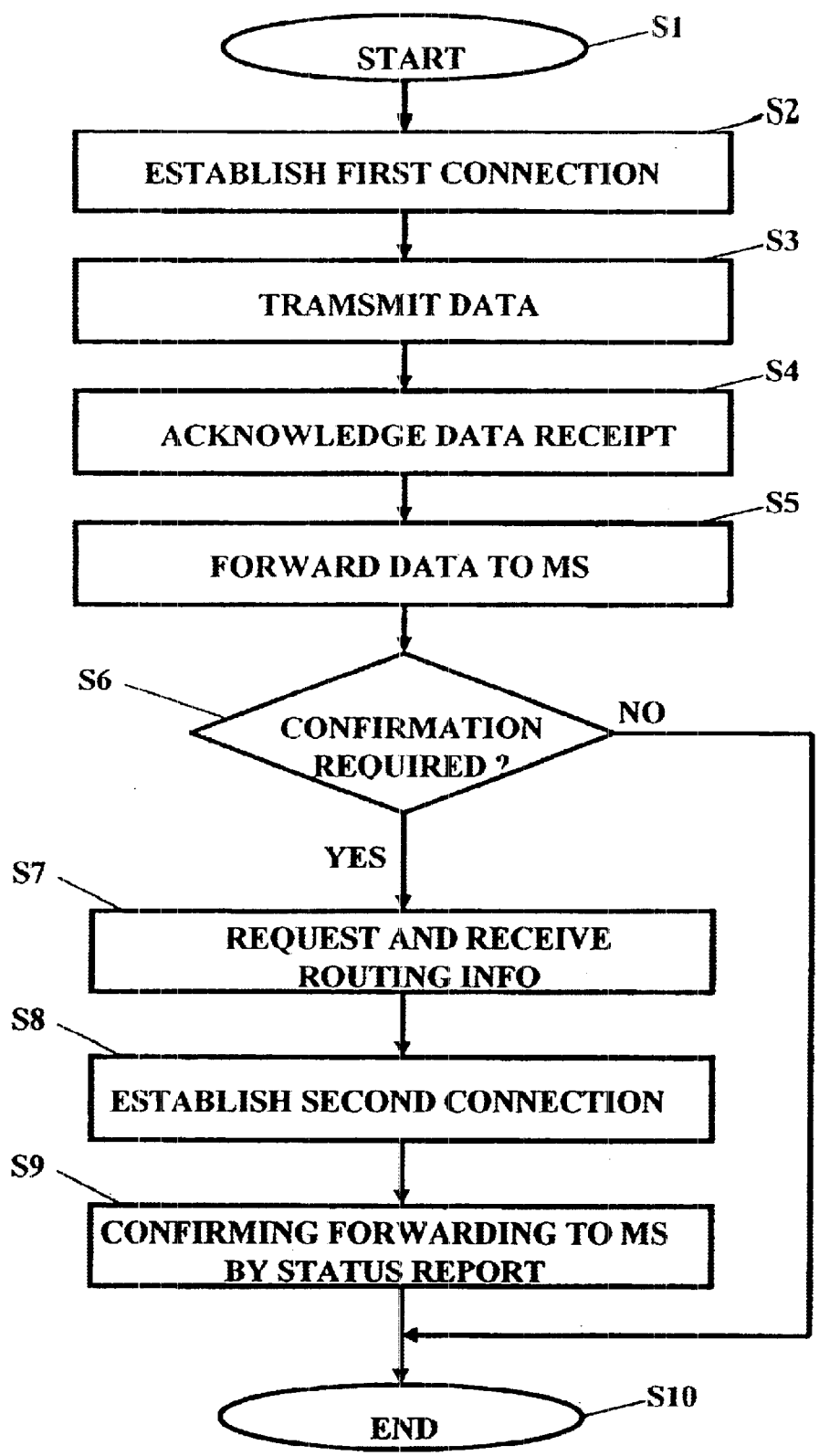
FIG. 2 is a flow chart illustrating a method according to the present invention.

In FIG. 2, when the SCP 1 wishes to send specific information concerning for example service information to a mobile station 2 participating on said service, the procedure is started (step S1). In step S2, a first communication connection is established by the SCP 1 to the SMSC 3. Thereafter, in step S3, a short message, i.e. said specific information, is sent from the SCP 1 to the SMSC 3. The SMSC 3 acknowledges the receipt of the short message (step S4). Thereafter, the first connection between the SMSC 3 and the SCP 1 is closed. The SMSC can forward the short message to its destination, i.e. to the mobile station 2, as described above (step S5).

In step S6, it is checked, whether a confirmation of the forwarding of the short message is required, i.e. whether it is required to notify to the SCP 1 from the SMSC 3 about the outcome of the short message sent to the mobile station 2. The confirmation may be performed by sending a status report from the SMSC to the SCP.

If in step S6 no confirmation is required, the process proceeds to step S10 and ends, i.e. only the acknowledgement of step S4 has been sent to the SCP. On the other hand, if in step S6 a confirmation is required, step S7 follows, in which routing information of the SCP 1 is requested and received by the SMSC 3. The routing information can be requested from the home location register 5 or from the SCP 1 itself. It is decided in the implementation phase by the operator where the query of location information is to be made. A description of the two cases will follow below with reference to FIGS. 5A and 5B.

After the SMSC 3 has received the routing information in step S7, a second connection between the SMSC 3 and the SCP 1 is established. Via this second connection, the SMSC forwards a status report as a short message to confirm the sending of the specific information, i.e. the short message of step S3 to the mobile station 2 (step S9). After closing the second connection, the process is finished in the step S10.

Message dialogues between the respective network elements involved in the above described procedure are illustrated in FIGS. 4A, 4B and 5A, 5B which will be now described with the corresponding parameters.

In FIG. 4A the dialogue for sending short messages from the SCP to the SMSC is shown. First, a MAP-Open-Request is sent from the SCP. This service is used to establish a dialogue between two MAP service users and to send the short message for example to the SMSC. This service is a confirmed service. Service parameters therefor are e.g.:

application context name for identifying the type of application context; destination address and destination reference for identifying the international mobile subscriber identity IMSI;

originating address and originating reference which is in the case that the SCP sends the short message for example either the mobile subscriber international ISDN (MSISDN) number of the SCP or the network element number of the SCP;

result for indicating whether the service is accepted;

refuse reason for indicating why the service is not accepted, for example wrong MAP version, invalid destination or originating reference and the like; and provider error for indicating a protocol type error such as service not supported, resource limitation, initiation of release no response and the like.

After the MAP-Open-Request is sent, the SCP sends a MAP-Forward-Short-Message by which user information are delivered to the mobile station. Also this service is a confirmed service. For example, the following parameters are used:

SM RP DA, which is a SMSC destination address. The format is an international ISDN address.

SM RP OA, which is the short message originating address. In the case, that the SCP is sending the short message it is the MSISDN number of the SCP. If the network has several SCPs each has to have its own MSISDN number.

SM RP UI, which includes several sub-parameters. Said sub-parameters will be described later.

user error, for example unidentified subscriber, system failure, short message delivery failure in mobile terminated or mobile originated short messages (e.g. protocol error or the like), unexpected data value and the like.

As mentioned above, the parameter SM RP UI comprises several sub-parameters. It has to be coded according to a commonly known SMS-Submit type. Examples of such sub-parameters are given herein below (abbreviation TP stands for transport protocol):

TP-Message-Type-Indicator;

TP-Status-Report: indicates whether a status report is requested or not;

TP-Destination-Address: indicating the address of the receiving mobile station;

TP-Protocol-Identifier: identifies, which protocol type is used, for example short message type, replace short message type, return call message (A short message type 0 indicates that the mobile station has to acknowledge the receipt of the short message but may discard its contents. The Replace Short Message feature is optional for the mobile station and the SIM but if implemented it shall be performed as described here. For mobile terminated short messages, on receipt of a short message from the SMSC, the mobile station shall check to see if the associated protocol identifier contains a Replace Short Message Type code. If such a code is present, then the mobile station will check an associated SMSC address and originating address and replace any existing stored message having the same protocol identifier code, SMSC address and originating address with the new short message and other parameter values. If there is no message to be replaced, the MS shall store the message in the normal way. If a Replace Short Message Type code is not present then the MS will store the message in the normal way. On the other hand, in mobile originated short messages, the SMSC reacts similarly but only the address of the originating mobile station or any other source is checked.);

TP-Data-Coding-Scheme: provides alphabets and language-specific information and data coding class (for example, class 0: mobile station has to display short message immediately, used for prepaid; class 1: mobile station has to send an acknowledgement to the SMSC; class 2: mobile station has to ensure that the message has been transferred to the SMS data field of the SIM card, used for localized GSM service; class 3: similar to class 1);

TP-User-Data-Length;

TP-User-Data: coded for example for localized services in a Localized GSM System Interface Specification.

After the above described MAP-Forward-Short-Message in FIG. 4A, the SCP sends a MAP-Delimiter-Request to the SMSC which is used for delivery of the short message to the mobile station. This service is unconfirmed.

The SMSC sends MAP-Open-Confirm and a MAP-Forward-Short-Message-Confirm messages to the SCP. By the latter the receipt of the short message is acknowledged. Further, a MAP-Close-Indication is sent to the SCP by which the MAP dialogue is closed. This service is also unconfirmed and includes for example a release method parameter by which it is indicated whether a normal release or a prearranged release method for the dialogue is used.

In FIG. 4B also a dialogue between the SCP and the SMSC is shown similar to that described with reference to FIG. 4A. However, in this case, the dialogue is initiated by the SMSC (MAP-Open-Request, MAP-Forward-Short-Message-Request, MAP-Delimiter-Request) and responded by the SCP (MAP-Open-Confirm, MAP-Forward-Short-Message-Confirm, MAP-Close-Indication). The above described parameters also valid in this case. The dialogue illustrated in FIG. 4B is for example used for sending the status report to the SCP, which will be described below.

Figure 5A:
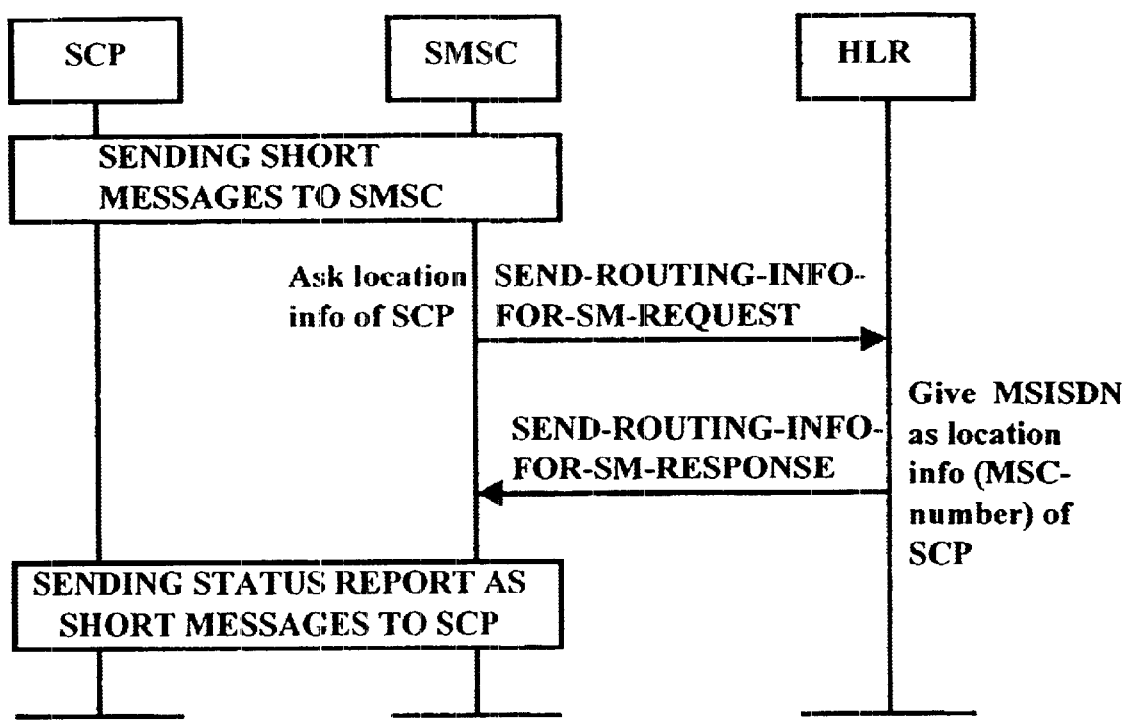
FIGS. 5A and 5B are message charts illustrating a dialogue relating to a confirmation.
Figure 5B:
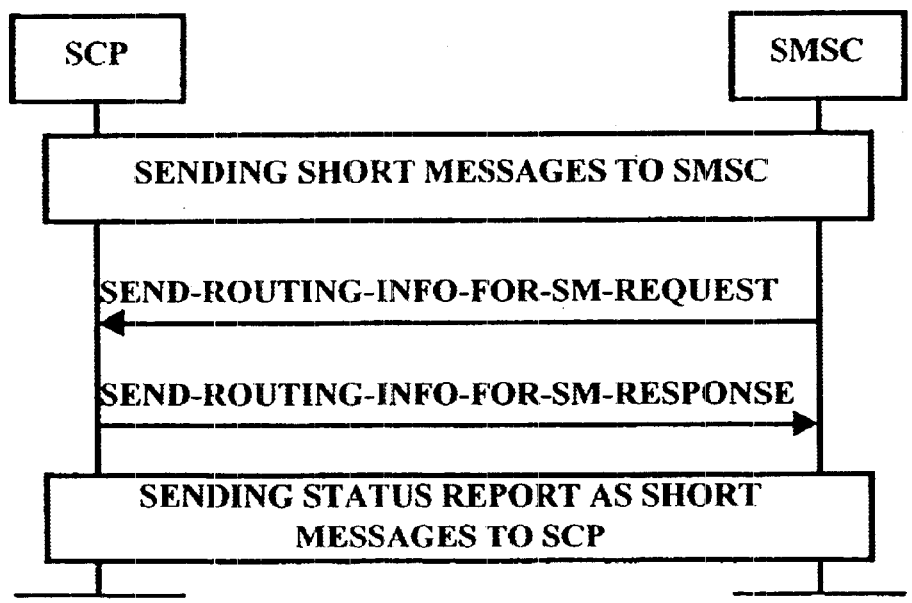

When in step S6 according to FIG. 2 a confirming of the short message is required, the SMSC has to send a status report to the SCP. Therefor, the SMSC has to query routing information, i.e. location information of the SCP. As mentioned above, there are two possibilities where the SMSC can request said routing information which are illustrated in FIGS. 5A and 5B. Sub-routines 'sending short messages to SMSC' and 'sending status report as short messages to SCP' correspond to the message charts illustrated in FIGS. 4A and 4B, respectively.

A first case is shown in FIG. 5A. Here, the routing information is requested from the home location register HLR. After the short message was sent from the SCP to the SMSC (see FIG. 4A), the SMSC asks for location information of the SCP at the HLR by a Send-Routing-Info-For-SM-Request. By responding to said query the HLR gives the MSISDN (or MSC number) of the SCP as said location information to the SMSC. Said Send-Routing-Info-For-SM service includes several parameters which are similar to that of a commonly known MAP-Send-Routing-Info service. These parameters are for example:

MSISDN number of the SCP;

SM-RP-PRI, which indicates whether or not a delivery of the short message shall be attempted when the service center address is already contained in a Message Waiting File;

service center address of the SMSC;

MSC number, which is the MSISDN number of the SCP;

user error, such as unknown subscriber, system failure, data missing and the like;

provider error, such as a protocol type error, for example service not supported, resource limitation, initiation of release no response and the like.

In the above described case, the SCP acts like a mobile station and a mobile switching center MSC to the SMSC.

Another possibility for the SMSC to request the routing information of the SCP is shown in FIG. 5B. Here, the Send-Routing-Info-For-SM-Request is directed by the SMSC to the SCP itself. Therefore, the SCP has implemented the MAP-Send-Routing-Info-For-SM service, as mentioned above. In the response, the SCP includes the MSISDN number of the SCP. The location information for the subscriber (MSC number) is also the MSISDN number of the SCP. In this case, the SCP acts as mobile station, home location register and mobile switching center to the SMSC.

In both described cases, after receiving the routing information, the SMSC sends a status report using said routing information to the SCP according to the operation shown in FIG. 4B.

It is to be noted, that besides the parameters and sub-parameters described above which relate to the services used in MAP dialogue there are also further parameters and sub-parameters not mentioned but present and known to a person skilled in the art.

A procedure for checking a MAP type used by the SCP is now described with reference to FIG. 3.

The MAP type, indicated for example by a version number, is important to know, since sending of the status report is only possible when the SMSC supports at least version 2. Therefore, when the SCP requests a status report for confirming the outcome of the short message, it has to be ensured that the SMSC is able to send such a status report.

Figure 3:
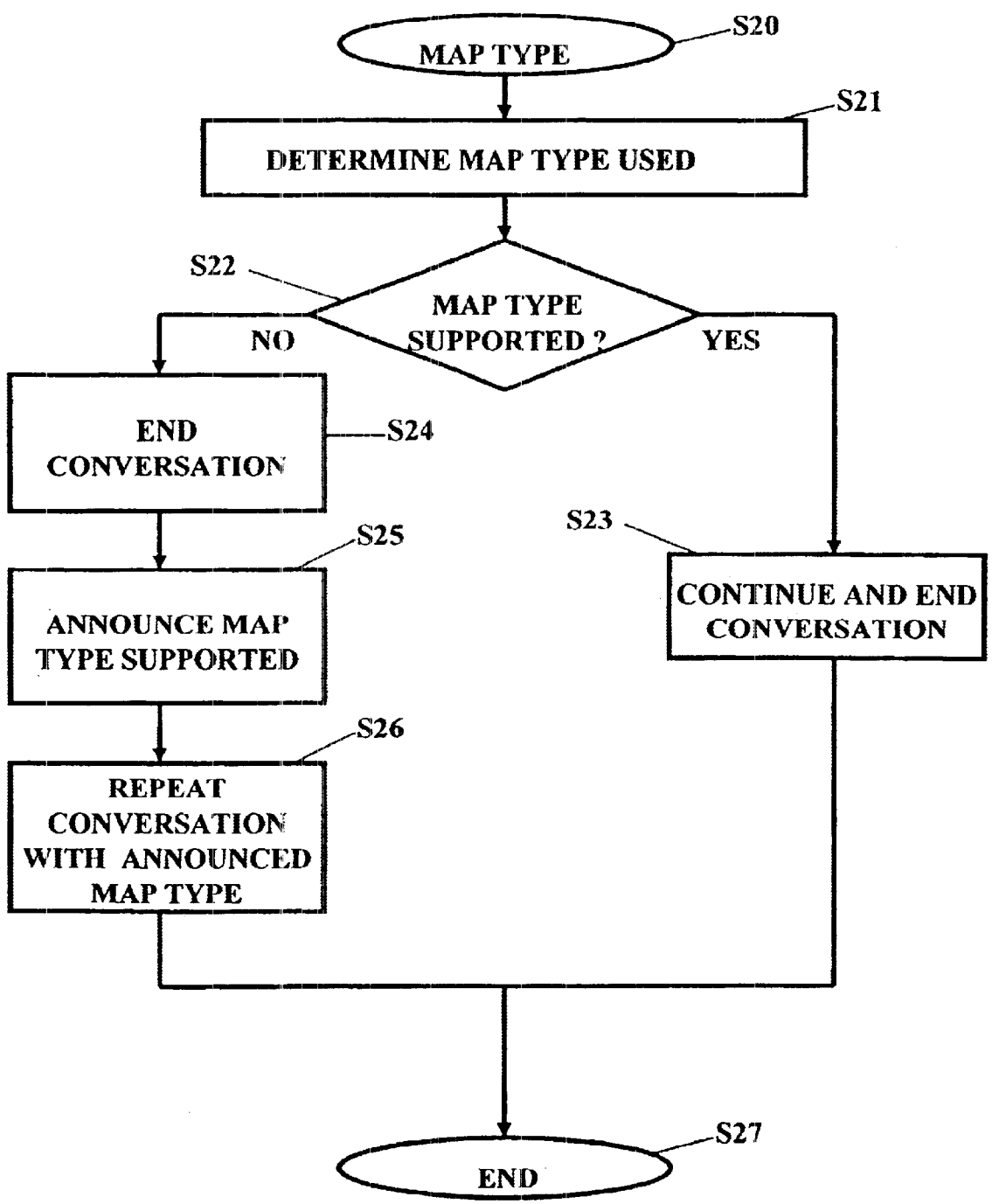
FIG. 3 is a flow chart illustrating a MAP type determination procedure.

In FIG. 3, when starting a MAP type determining procedure, first in step S21 the MAP type (e.g. by the version number) used by the SCP is determined. If the MAP type used is supported by the SMSC (step S22), i.e. at least version 2, the handling of the short message is performed as described above and a status report can be returned (step S23). However, when it is determined that the MAP type used by the SCP is not supported by the SMSC, i.e. the SMSC only supports for example version 1, the dialogue is ended by the SMSC (step S24). The MAP type supported (e.g. version 1) is announced to the SCP (step S25). Thereafter, in step S26, the SCP opens a new dialogue with the MAP type supported by SMSC.

The message flow is similar to that illustrated in FIG. 4A. However, in the MAP-Forward-Short-Message-Confirm message from the SMSC a refuse reason is given relating to the fact that the application context is not supported. After MAP-Close-Indication the process is repeated accordingly beginning with a new MAP-Open-Request by the SCP.

It is to be noted that sending of short messages according to the invention is also possible when the SMSC does not support at least MAP type version 2. In such case, however, a status report can not be sent back to the SCP.

Figure 6:
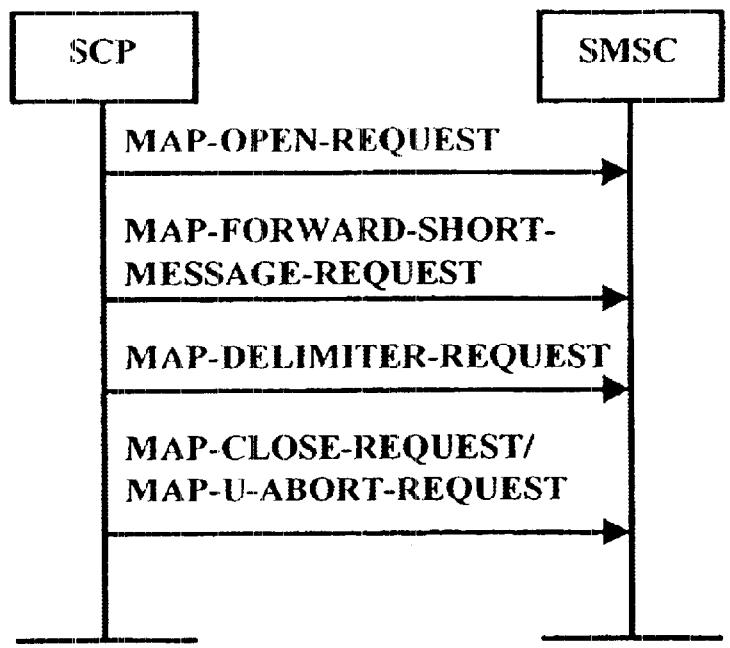
FIG. 6 is a message chart illustrating a dialogue between two network elements.
Figure 7:
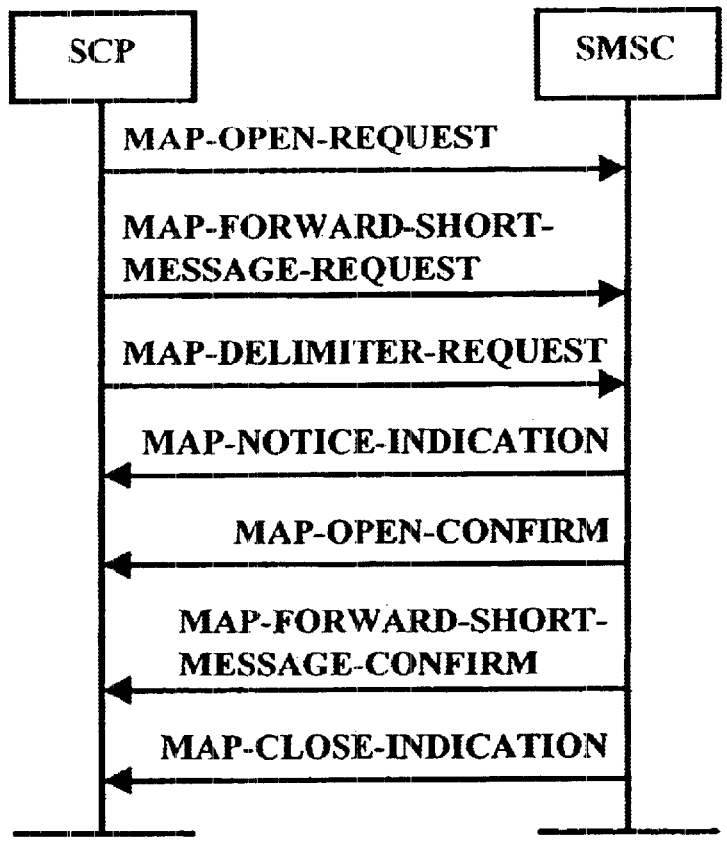
FIG. 7 is a message chart illustrating a dialogue between two network elements.

Now, reference is made to FIGS. 6 and 7, in which the handling of error cases is illustrated. There are some error cases which have to been notified when MAP services are used. The MAP dialogue can be finished by a corresponding MAP-Abort service at any time after the MAP dialogue has been opened.

One possibility is that the MAP service user, i.e. the SCP, ends the MAP dialogue. In this case, there can be used a MAP-Close service as described above or a MAP-U-Abort service. The latter uses parameters such as follows:

user reason (resource limitation, resource unavailable, application procedure cancellation, procedure error);

diagnostic information which may give additional information for some values of the user reason parameter (for example in case of application procedure cancellation: handover cancellation, network path release, call release and the like).

Signaling shown in FIG. 6 for a user initiated connection end is similar to that described with reference to FIG. 4A.

The other possibility is that the MAP service provider, i.e. the SMSC, ends the MAP dialogue. In this case, there can be used a MAP-Close service as described above, or a MAP-P-Abort service, or a MAP-Notice service.

The MAP-P-Abort service enables the provider (SMSC) to abort the MAP dialogue. Parameters used therein are for example provider reason such as provider malfunction, version incompatibility, abnormal MAP dialogue and the like, and source which indicates the source of the problem (MAP, network service and the like).

Although not shown in FIG. 6, the message flow for the case where the SMSC ends the MAP dialogue is similar to that of the case where the SCP ends the MAP dialogue. The difference is that the MAP-P-Abort message (instead of the MAP-U-Abort message shown in FIG. 6) is directed from the SMSC to the SCP.

In FIG. 7, message flow in case of a MAP-Notice service is shown. The MAP-Notice service is used to notify the MAP service user, i.e. the SCP, the MAP dialogue problem. A parameter of this service is the problem diagnostic which indicates for example an abnormal event or a rejected response.

When using a short message transmission according to the present invention, the services should take care about charging when they are used.

Although in the above described only the transmission of a short message from a SCP to a mobile station via a SMSC by using a MAP interface is described, it is also possible to send the short messages directly to the mobile station for example via X.25, local area network LAN, transfer control protocol/internet protocol TCP/IP, and the like. Additionally, it is also possible to use unstructured supplementary service data instead of short messages.

The present invention proposes a method for transmitting specific information between a controlling network element and a terminal device via a service center in a communication network, said method comprising the steps of transmitting user data and said specific information between said network element and said service center via a first communication connection by using an interworking functionality; and forwarding at least said specific information from said service center to said terminal device by using a gateway functionality. It is further possible to check whether a confirming for outgoing of said specific information to said terminal device is required. If such a confirming is required, routing information for said controlling network element are requested and received by said service center from a network element. The routing information are used for transmitting a status report from said service center to said controlling network element. Moreover, the present invention proposes a corresponding device and/or system.

It should be understood that the above description and accompanying figures are merely intended to illustrate the present invention by way of example only. The preferred embodiments of the present invention may thus vary within the scope of the attached claims.

What is claimed is:

1. A method for transmitting user specific data and network specific information between a service control point (1) of an intelligent network and a terminal device (2) in a mobile communication network via a short message service center (3, 7) of said mobile communication network, said method comprising the steps of:

transmitting (S1, S2, S3) said user specific data and network specific information between said service control point (1) and said short message service center (3, 7) via a first mobile application part protocol based communication connection by using a short message service interworking functionality, wherein the transmission of the user specific data and network specific information is initiated by the service control point (1); and forwarding (S5) at least said network specific information from said short message service center (3, 7) to said terminal device (2) by using a short message service gateway functionality.

2. A method according to claim 1, further comprising the step of:

sending an acknowledgment (S4) for a receipt of said user specific data and network specific information from said short message service center (3, 7) to said serving control point (1).

3. A method according to claim 1, further comprising the steps of:

checking (S6) whether a confirming for outgoing of at least said network specific information to said terminal device (2) is required; and if such a confirming is required, requesting and receiving routing information (S7) for said service control point (1) by said short message service center (3, 7) from a network element (1, 5); and using said received routing information for transmitting a status report (S8, S9) from said short message service center (3, 7) to said service control point (1) via a second mobile application part protocol based communication connection to notify said service control point (1) about a result of said forwarding of at least said network specific information to said terminal device (2).

4. A method according to claim 1, further comprising a step of determining and processing (S21, S22) a type of said mobile application part protocol.

5. A method according to claim 3, wherein said network element (5) from which said routing information for said service control point (1) is requested by said short message service center (3, 7) is a home location register.

6. A method according to claim 3, wherein
said network member (1) from which said routing information for said service control point is requested by said short message service center is said service control point.

7. A method according to claim 3, wherein
said service control point (1) is able to cancel either said first or said second communication connection between said service control point (1) and said short message service center (3, 7).

8. A method according to claim 3, wherein
said short message service center (3, 7) is able to cancel either said first or said second communication connection between said service control point (1) and said short message service center (3, 7).

9. A device located in a service control point (1) of an intelligent network in a mobile communication network, said device comprising
transmitter means for transmitting user specific data and network specific information between said service control point (1) and a short message service center (3, 7) via a mobile application part protocol based communication connection by using a short message service interworking functionality, wherein the transmission of the user specific data and network specific information is initiated by the service control point (1); and
receiver means for receiving acknowledgement of receipt.

10. A device located in a short message service center (3, 7) of a communication network, said device comprising
transmitter means for transmitting user specific data and network specific information between a service control point (1) of an intelligent network and said short message service center (3, 7) via a mobile application part protocol based communication connection by using a short message service interworking functionality, wherein the transmission of the user specific data and network specific information is initiated by the service control point (1); and
means adapted to send an acknowledgment for a receipt of said user specific data and network specific information from said short message service center (3, 7) to said service control point (1).

11. A device according to claim 10, said device further comprising:
means adapted to forward at least said network specific information from said short message service center (3, 7) to a terminal device (2) by using a short message service gateway functionality.

12. A device according to claim 11, further comprising:
checking means for checking whether a confirming for outgoing of at least said least network specific information to said terminal device (2) is required; and if such a confirming is required,
means adapted to request and receive routing information for said service control point (1) from a network element (1, 5); and
means adapted to use said received routing information for transmitting a status report from said short message service center (3, 7) to said serving control point (1) to notify about a result of said forwarding of at least said network specific information to said terminal device (2).

13. A device according to claim 10, further comprising
means for determining and processing the type of said mobile application part protocol.

14. A system comprising a first device located in a service control point (1) of an intelligent network in a mobile communication network, said first device comprising transmitter means for transmitting user specific data and network specific information from said service control point (1) to short message service center (3, 7) via a mobile application part protocol based communication connection by using a short message service interworking functionality, wherein the transmission of the user specific data and network specific information is initiated by the service control point (1), and
a second device located in a short message service center (3, 7) of a mobile communication network, said second device comprising transceiver means for transmitting user specific data and network specific information between said service control point (1) and a short message service center (3, 7) via a mobile application part protocol based communication connection by using a short message service interworking functionality.

15. A method for transmitting user specific data and network specific information between a service control point (1) of an intelligent network and a terminal device (2) in a mobile communication network via a short message service center (3, 7) of said mobile communication network, said method comprising the steps of:
transmitting (S1, S2, S3) said user specific data and network specific information between said service control point (1) and said short message service center (3, 7) via a first mobile application part protocol based communication connection by using a short message service interworking functionality;
forwarding (S5) at least said network specific information from said short message service center (3, 7) to said terminal device (2) by using a short message service gateway functionality;
checking (S6) whether a confirming for outgoing of at least said network specific information to said terminal device (2) is required; and if such a confirming is required,
requesting and receiving routing information (S7) for said service control point (1) by said short message service center (3, 7) from a network element (1, 5); and
using said received routing information for transmitting a status report (SB, S9) from said short message service center (3, 7) to said service control point (1) via a second mobile application part protocol based communication connection to notify said service control point (1) about a result of said forwarding of at least said network specific information to said terminal device (2).

16. A method according to claim 15, wherein
said network element (5) from which said routing information for said service control point (1) is requested by said short message service center (3, 7) is a home location register.

17. A method according to claim 15, wherein
said network member (1) from which said routing information for said service control point is requested by said short message service center is said service control point.

18. A method according to claim 15, wherein said service control point (1) is able to cancel either said first or said second communication connection between said service control point (1) and said short message service center (3, 7).

19. A method according to claim 15, wherein
said short message service center (3, 7) is able to cancel either said first or said second communication connection between said service control point (1) and said short message service center (3, 7).

20. A method for transmitting user specific data and network specific information between a service control point (1) of an intelligent network and a terminal device (2) in a mobile communication network via a short message service center (3, 7) of said mobile communication network, said method comprising the steps of:
    transmitting (S1, S2, S3) said user specific data and network specific information between said service control point (1) and said short message service center (3, 7) via a first mobile application part protocol based communication connection by using a short message service interworking functionality;
    forwarding (S5) at least said network specific information from said short message service center (3, 7) to said terminal device (2) by using a short message service gateway functionality; and
    determining and processing (S21, S22) a type of said mobile application part protocol.

21. A device located in a short message service center (3, 7) of a communication network, said device comprising:
    transmitter means for transmitting user specific data and network specific information between a service control point (1) of an intelligent network and said short message service center (3, 7) via a mobile application part protocol based communication connection by using a short message service interworking functionality;
    means adapted to send an acknowledgment for a receipt of said user specific data and network specific information from said short message service center (3, 7) to said service control point (1);
    checking means for checking whether a confirming for outgoing of at least said least network specific information to said terminal device (2) is required; and if such a confirming is required, means adapted to request and receive routing information for said service control point (1) from a network element (1, 5); and
    means adapted to use said received routing information for transmitting a status report from said short message service center (3, 7) to said serving control point (1) to notify about a result of said forwarding of at least said network specific information to said terminal device (2).

* * * * *

UNITED STATES PATENT AND TRADEMARK OFFICE
CERTIFICATE OF CORRECTION

PATENT NO. : 6,690,942 B2 Page 1 of 1
DATED : February 10, 2004
INVENTOR(S) : Tuija Vikman and Tuure Leinonen It is certified that error appears in the above-identified patent and that said Letters Patent is hereby corrected as shown below:

Column 12,
Line 48, please delete "SB" and substitute -- S8 --.

Signed and Sealed this

Seventeenth Day of August, 2004

JON W. DUDAS
*Acting Director of the United States Patent and Trademark Office*